United States Patent
Lippitt et al.

(10) Patent No.: US 10,270,712 B1
(45) Date of Patent: Apr. 23, 2019

(54) VIRTUAL STORAGE NETWORK CONNECTIVITY SERVICE

(71) Applicant: EMC IP Holding Company LLC, Hopkinton, MA (US)

(72) Inventors: Mark C. Lippitt, Westborough, MA (US); Erik Smith, Douglas, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 285 days.

(21) Appl. No.: 14/674,153

(22) Filed: Mar. 31, 2015

(51) Int. Cl.
- *H04L 12/911* (2013.01)
- *H04L 29/06* (2006.01)
- *H04L 29/08* (2006.01)
- *G06F 9/455* (2018.01)

(52) U.S. Cl.
CPC ........ *H04L 47/828* (2013.01); *G06F 9/45558* (2013.01); *H04L 67/141* (2013.01); *H04L 67/16* (2013.01); *H04L 67/42* (2013.01); *G06F 2009/45595* (2013.01)

(58) Field of Classification Search
USPC .............................................. 709/226-229
See application file for complete search history.

(56) References Cited

U.S. PATENT DOCUMENTS

| | | | | |
|---|---|---|---|---|
| 8,695,079 B1* | 4/2014 | Miller | .............. | H04L 63/08 709/223 |
| 2009/0052444 A1* | 2/2009 | Ringen | ................. | H04L 45/00 370/389 |
| 2014/0047040 A1* | 2/2014 | Patiejunas | ............... | H04L 51/24 709/206 |
| 2014/0130055 A1* | 5/2014 | Guha | .................... | G06F 3/0604 718/104 |
| 2015/0112933 A1* | 4/2015 | Satapathy | ......... | G06F 17/30575 707/634 |
| 2016/0294615 A1* | 10/2016 | Fiorone | ............. | H04B 10/2581 |

OTHER PUBLICATIONS

"A simple Virtual Storage Network Demo," https://www.youtube.com/watch?v=OiDSw3IrlfQ, Online Video Demonstrating Software Operation, May 2014.
"A Simple Virtual Storage Network Demo—Brass Tacks," http://brasstacksblog.typepad.com/brass-tacks/2014/05/a-simple-virtual-storage-network-demo.html, May 2, 2014.
Demonstration of software, EMC World 2014, May 5-8, 2014.
M. Lasserre, "Framework for Data Center (DC) Network Virtualization," https://datatracker.ietf.org/doc/rfc7365/, Internet Engineering Task Force (IETF), ISSN: 2070-1721, Oct. 2014.

* cited by examiner

*Primary Examiner* — Younes Naji
*Assistant Examiner* — Da T Ton
(74) *Attorney, Agent, or Firm* — Muirhead and Saturnelli, LLC

(57) ABSTRACT

Described are techniques for processing a network connectivity request received by a virtual network connectivity service. First processing is performed by the virtual network connectivity service to service the network connectivity request. The first processing includes determining a first of a plurality of network control planes to which the network connectivity request is directed, selecting, in accordance with the first network control plane, one of a plurality of modules, and invoking the one module in connection with performing processing to service the network connectivity request.

19 Claims, 12 Drawing Sheets

VIRTUAL STORAGE NETWORK CONNECTIVITY SERVICE

BACKGROUND

Technical Field

This application generally relates to networks and more particularly to a virtual network connectivity service for virtual network connectivity provisioning.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

SUMMARY OF THE INVENTION

In accordance with one aspect of the invention is a method of processing a network connectivity request comprising: receiving, by a virtual network connectivity service, the network connectivity request; performing first processing by the virtual network connectivity service to service the network connectivity request, said first processing including: determining a first of a plurality of network control planes to which the network connectivity request is directed; selecting, in accordance with the first network control plane, one of a plurality of modules; and invoking the one module in connection with performing processing to service the network connectivity request. The virtual network connectivity service may service network connectivity requests for the plurality of network control planes and wherein each of the plurality of modules may be customized to interface to a different one of the plurality of network control planes. The virtual network connectivity service may include a consumer interface that receives the network connectivity request. The consumer interface may include any of a command line interface and an application programming interface. The network connectivity request may be made using any of the command line interface and the application programming interface included in the consumer interface. Each of the plurality of network control planes may include a network controller for said each network control plane, and wherein a network control-specific application programming interface may be specified for communicating with the network controller. A first network-control specific application programming interface may be specified for communicating with a first network controller of the first network control plane and the one module may be customized to communicate with the first network controller using the first network-control specific application programming interface. The virtual network connectivity service may include a first discovery module that discovers a type of control plane used in connection with a virtual network for which the network connectivity request is issued, and the first discovery module may be invoked to determine the first network control plane to which the network connectivity request is directed. The virtual network connectivity service may include a second discovery module that discovers an identity of a network virtualization edge, and the second discovery module may be invoked to perform one or more operations of said first processing. The virtual network connectivity service may be a virtual storage network connectivity service, the network connectivity request may be a request for network connectivity over a first virtual network for a first tenant and the first virtual network may be a virtual storage network that carries I/O traffic of a data path for the first tenant. The method may include receiving, by the virtual network connectivity service, a second network connectivity request that is a request for network connectivity over a second virtual network for a second tenant and the second virtual network that is a virtual storage network carrying I/O traffic of a data path for the second tenant, wherein the first virtual network and the second virtual network share resources of a same physical network; and performing second processing by the virtual network connectivity service to service the second network connectivity request. The second processing may include determining a second of the plurality of network control planes different from the first network control plane to which the second network connectivity request is directed; selecting, in accordance with the second network control plane, a second of the plurality of modules; and invoking the second module in connection with performing processing to service the second network connectivity request. A second network-control specific application programming interface may be specified for communicating with a second network controller of the second network control plane and the second module may be customized to communicate with the second network controller using the second network-control specific application programming interface. The virtual network connectivity service may be a virtual storage network connectivity service. The network connectivity request may be a request for network connectivity over a first virtual network that is a virtual storage network that carries I/O traffic of one or more data paths. The network connectivity request may establish a connection between two data storage system services. The network connectivity request may be a request to perform any of: add a virtual network, remove a virtual network, show information about a particular virtual network, add a tenant system to a particular virtual network on a particular network virtualization edge by connecting the tenant system to a particular virtual access point, remove a first tenant system from a particular virtual network on a particular network virtualization edge by connecting the first tenant system to a particular virtual access point, show tenant systems attached to a particular virtual network on a particular virtual access point, and show information about any of: one or more virtual networks, one or more tenant systems, one or more network virtualization edges, one or more virtual access points, one or more network virtualization authorities, one or more network control planes, one or more network controllers, and one or more data centers. The consumer interface may be network agnostic and network control plane neutral having a vocabulary that is independent of any of the plurality of network control planes. The consumer interface may be storage-friendly in that the consumer interface may be usable by any storage service to establish connectivity to any other potentially connectable storage service. The consumer interface may be storage-friendly in that the consumer interface provides an abstraction of the plurality of network control planes and a different one of a plurality of interfaces associated with each of the plurality of network control planes and insulates a consumer of the consumer interface from changes to said plurality of network control planes and the plurality of interfaces.

In accordance with another aspect of the invention is a system comprising: a processor; and a memory comprising code stored thereon that, when executed performs a method of processing a network connectivity request including: receiving, by a virtual network connectivity service, the network connectivity request; performing first processing by the virtual network connectivity service to service the network connectivity request, said first processing including: determining a first of a plurality of network control planes to which the network connectivity request is directed; selecting, in accordance with the first network control plane, one of a plurality of modules; and invoking the one module in connection with performing processing to service the network connectivity request.

In accordance with another aspect of the invention is a computer readable medium comprising code stored thereon that, when executed, performs a method of processing a network connectivity request comprising: receiving, by a virtual network connectivity service, the network connectivity request; performing first processing by the virtual network connectivity service to service the network connectivity request, said first processing including: determining a first of a plurality of network control planes to which the network connectivity request is directed; selecting, in accordance with the first network control plane, one of a plurality of modules; and invoking the one module in connection with performing processing to service the network connectivity request.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
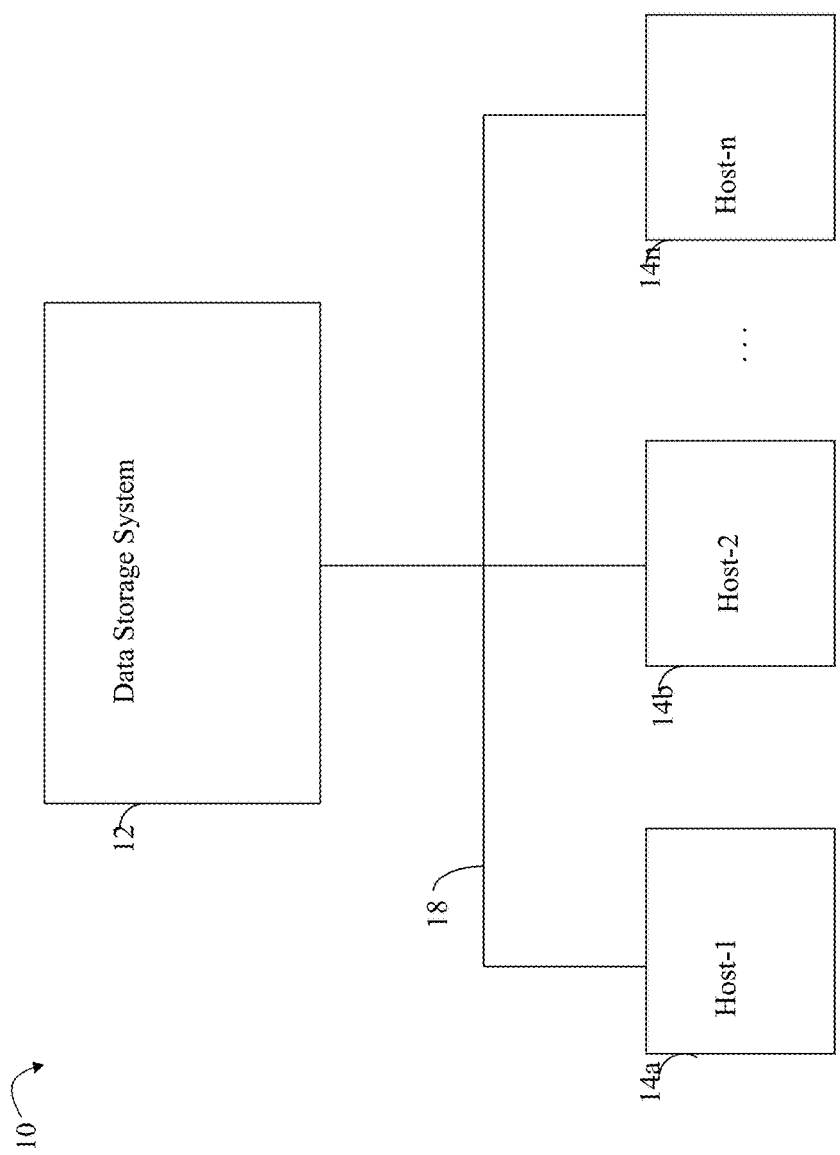
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, file based protocols (e.g., NFS, SMB Direct), and the like. Some or all of the connections by which the hosts and data storage system 12 may be connected to the communication medium 18 may pass through other communication devices, switching equipment that may exist such as a phone line, a repeater, Ethernet switch (e.g., TOR (top-of-rack), spine of a CLOS network), a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
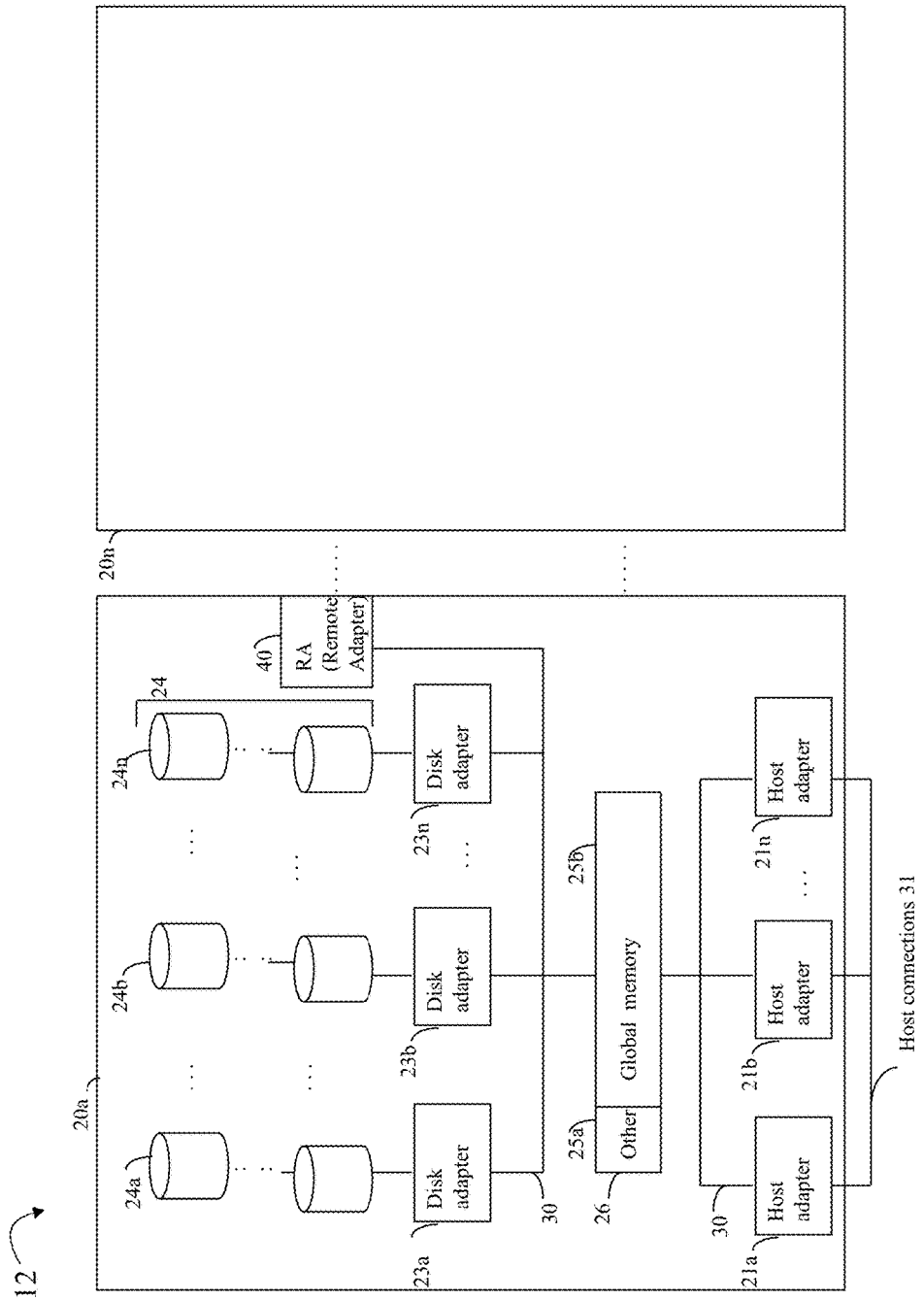
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media. For example, physical devices included in an embodiment of a data storage system may include one or more types of rotating disk drives (e.g., SATA, SAS, FC 15K RPM, FC 10K RPM), one or more types of flash-based storage (e.g., SLC (single level cell) flash, MLC (multi-level cell) flash, TLC, (tri-level cell) flash) or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

Figure 2B:
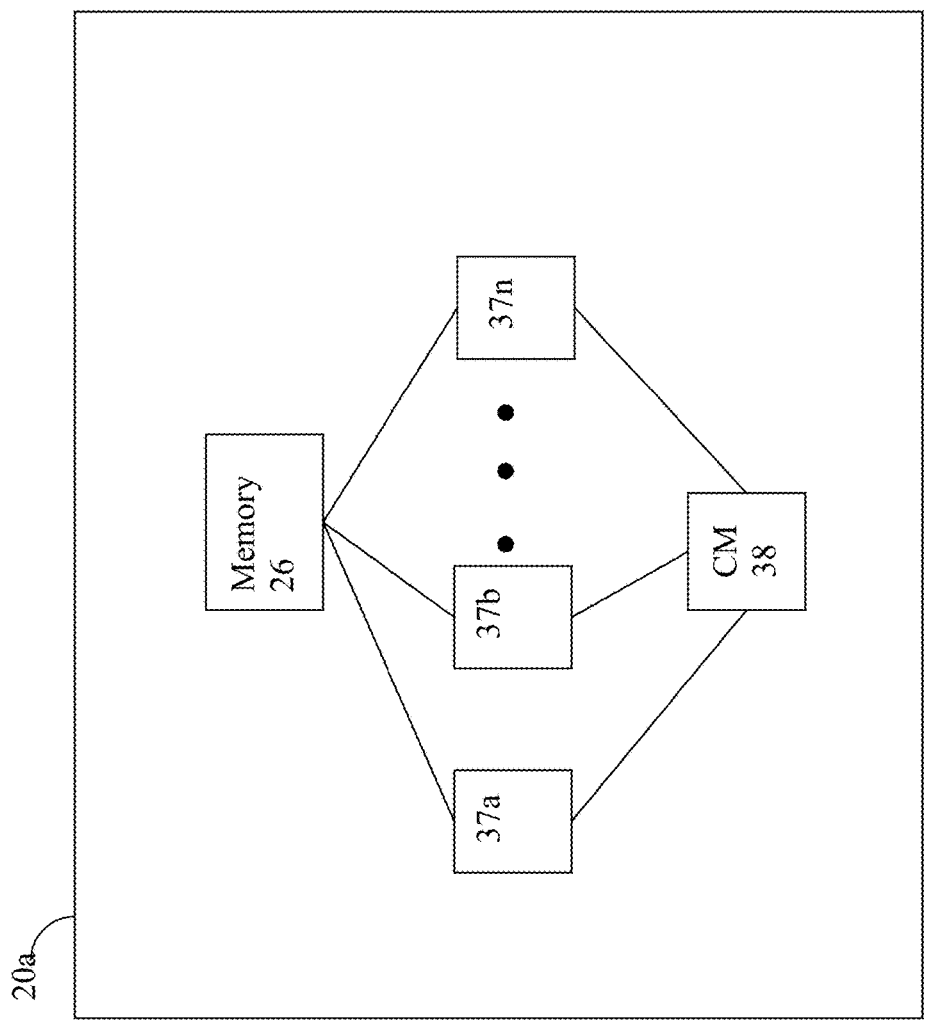
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

In some embodiments, the data storage system may be an intelligent data storage system having its own mapping layer such that the LUN known or exposed to the host may not directly correspond to a physical device such as a disk drive. Additionally, the host or other client of the data storage system may also have one or more additional mapping layers, such as a logical volume manager, that further maps the LUN exposed by the data storage system to one or more other logical entities, such as logical volumes, used by the host. For example, a LUN provided by the data storage system to host may be mapped by the data storage system to one or more physical drives, multiple LUNs may be located on a same physical device, multiple physical drives, and the like. On the host side, the LUN exposed to the host may be further mapped to other logical entities, such as host-side logical volumes, file systems, and the like.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

A physical network infrastructure may generally include the physical components or hardware needed for networking. Such physical components may include, for example, cables, physical switches and adapters, physical ports, NICs, and the like, as may be included in a particular physical network that may vary with embodiment. The physical network infrastructure may also be referred to as the network underlay.

A virtual network (VN) is built on top of the underlying physical network infrastructure or underlay and may be characterized as a logical abstraction of the physical network providing network services, such as for a particular tenant. A VN may also be referred to as a software defined network with physical network resources (e.g., physical switches, NICs (network interface cards) and/or virtual network resources (e.g., virtual switches) provisioned programmatically using software, such as by a network administrator, to automate the network provisioning process.

The network underlay or physical network infrastructure may be used by multiple tenants each having their own VN. Collectively, the one or more VNs may comprise the network overlay. A tenant may be a customer or particular user for which a VN is created having network resources provisioned from the physical network. The tenant having its own VN may also have other resources or assets provisioned for its use where such resources may be shared or may be provisioned for exclusive use by the tenant (e.g., depending on the particular tenant, VN, and usage of the VN). For example, a tenant may also have its own data stored on physical storage devices of a data storage system. The data may be used exclusively by the tenant and stored on one or more LUNs. The one or more LUNs may have physical storage provisioned from physical storage devices of a data storage system. Although the data may be a tenant-specific or exclusive resource, the data storage system and its physical storage devices and other physical resources may be shared among the different tenants having their data stored on the data storage system.

Thus, multiple VNs for multiple tenants may be provisioned from the same set of common physical and/or virtual resources such as of the network, data storage systems, hosts, and the like. In this manner, the VNs may be characterized as independent of the underlying physical network that may be consumed and configured for use in one or more VNs. The VNs may be provisioned or configured, reconfigured, stored, deleted, and the like, programmatically without reconfiguring the underlying physical network hardware or its topology.

A virtual storage network (VSN) may be characterized as a particular type of VN used with data storage systems and/or data storage system services to carry I/O traffic, such as I/O traffic between data storage system tenants or clients. Such I/O traffic may include, for example, read and/or write I/O operations issued by an application of a tenant where the I/O operations may be directed to one or more LUNs (e.g., where the application stores its data) or other storage services (e.g., which may be file-based, object-based, and the like). Generally, a VSN may connect, and be used to transfer I/O traffic of the data path between, any of data storage clients (e.g., between host systems), between data storage systems or services (e.g. between two data storage systems, an appliance and a data storage system, and the like), and/or between any data storage system or data storage system service and a data storage client (e.g., between a data storage system and a host). Generally, a data storage system service may be characterized as a data storage related service, such as data deduplication, data replication, data encryption/decryption, and the like, which may be performed by a data storage system or other component executing code to perform the data storage service.

Data deduplication services manage duplicate copies of content by keeping a single copy of the content and providing a reference or token to the single copy thereby eliminating redundant data. Only one unique instance of the data is actually retained on physical storage media and redundant data is replaced with a pointer to the unique data copy.

A control plane (also referred to as a network control plane) may be characterized as a logical network layer above the physical network and data plane (e.g., I/O path) where the control plane is used to control, for example, VN creation and also the provisioning, monitoring and/or management of physical and/or virtual network resources of a VN. Thus, in one aspect the control plane may be used to provision network resources of the VN as the "plumbing" of the data plane whereby, for example, in a VSN, the I/Os of the I/O path (e.g., data plane) are transmitted over the VN. With the control plane, VN connections may be specified such as, for example, what physical and/or virtual entities such as switches, routers, ports, and the like, may be connected to one or more hosts, data storage systems, and the like.

Different software platforms or environments by different vendors may be used to create VNs and accordingly provision network resources for the VNs. Each such platform may include its own network control plane exposing its own vendor-specific or platform-specific API (application programming interface) used to control VNs and provision and monitor network resources for VNs through the particular control plane. Thus, each implementation of a platform to provision network resources for VNs may have its own controller and require use of its platform-specific API, terminology, VN concepts, and the like. For example, such different platforms for VNs and provisioning network resources for such VNs include VMware® NSX for vSphere (NSX-V) having a first NSX controller and control plane, VMware® NSX for Multi-Hypervisors having a second NSX controller and control plane, Application Centric Infrastructure (ACI) framework and architecture by CISCO® having an ACI controller and control plane, Open Daylight (the Open Daylight Project) based on an open source framework having an Open Daylight controller and control plane, and Neutron included in the OpenStack platform which is an open source-based platform having its own controller and control plane.

Described in following paragraphs are techniques that may be used in connection with creating virtual networks (VNs) and provisioning network resources for use in such VNs using a Connectivity Service (CS) which facilitates communication with multiple different platform-specific controllers and control planes for network resource provisioning, management and control of VNs, and the like. In one embodiment such as with reference to FIG. 4 described elsewhere herein, a northbound or first API is provided for consumers or clients of the CS which may be characterized as network-agnostic and storage-friendly (described in more detail elsewhere herein). The CS may receive connectivity requests made using the first API and translate them into operations performed using a southbound or second API of the CS making outbound calls or requests to any of the different platform-specific APIs used by the supported network controllers. In one embodiment, the CS uses a plug-in architecture enabling such network provisioning over one or more supported network control planes where each may be included in a different platform for software-based VNs.

In such an embodiment, the CS may be characterized as hiding or abstracting from its consumers, using the first API, the unique requirements and ongoing technological changes of each network controller and network control plane of the different supported platforms. The CS allows such consumers to support multiple network control planes while minimizing development and testing resources. Thus, the CS provides for controlling and managing each VN using the particular one of the platform-specific controller APIs supported by the CS.

In following paragraphs, examples and embodiments, a VSN may be used as a particular type of VN to illustrate techniques herein. However, it should be noted that such techniques described herein are not limited to use with VSNs and may more generally be used in connection with VNs carrying other types of messages, data, or traffic. Furthermore, techniques herein may generally use a CS which, as applied to VSNs in one embodiment in accordance with techniques herein, may also be referred to as a virtual storage network connectivity service (VSN CS). The CS may, for example, run as a standalone service, be embodied in routines or functions of a software library, run as an internal service embedded or included with other software layers such as for one or more clients or consumers of the VSN CS, and the like.

In one embodiment in accordance with techniques herein, one or more host side applications, code of a data storage system appliance, and/or code of the data storage system (e.g., such as microcode of the data storage system) may execute in a virtualized environment as virtual machines (VMs). A VM may be defined as a software implementation of a physical machine that runs programs as if they were executing on a physical, nonvirtualized machine. Applications (generally) do not know they are running on a VM as opposed to running on a "bare metal" host or server, though some systems provide a para-virtualization environment that allows an operating system or application to be aware of the presence of virtualization for optimization purposes. For example, an embodiment may have one or more virtual machines executing on a single physical machine, such as a host, in a virtualized environment using virtualization software produced by VMware, Inc. In the context of each virtual machine, one or more applications may be executed, where the applications may include any one or more of, for example, an email application such as Microsoft Exchange, a web server, or a database application. Applications such as the foregoing may be executed on a host in the context of one or more virtual machines.

A hypervisor may perform VM management in connection with one or more VMs. Such a hypervisor may be installed and run directly on system hardware without requiring an underlying operating system. Each of the hypervisors may perform management of the underlying system's physical resources for use among the multiple VMs that can run simultaneously. The hypervisor manages and provides shared computation, memory, and storage services and network connectivity to the VMs that it hosts.

An example of a data storage system appliance is a data storage system virtualization appliance such as an EMC® VPLEX™ appliance which accesses and aggregates storage from multiple data storage systems whereby each such data storage system may be of the same or different types (e.g., same or different manufacturers as well as different array types that may be from a same manufacturer). In this manner, the appliance may present storage of the multiple data storage systems in an aggregated virtualized environment to one or more hosts and other clients. For example, a host may communicate with the appliance to access data on a virtualized storage devices LUN A exposed to the host and the virtualized storage device LUN A of the appliance may have its physical storage provisioned from one or more other data storage systems connected to the appliance. It should be noted that in order for a data storage appliance to present a LUN, the appliance needs a connection to a data storage capacity service, such as a data storage system having physical storage devices. The VSN CS in an embodiment in accordance with techniques herein may be used to dynamically establish such connectivity between the appliance and the data storage system.

Figure 3:
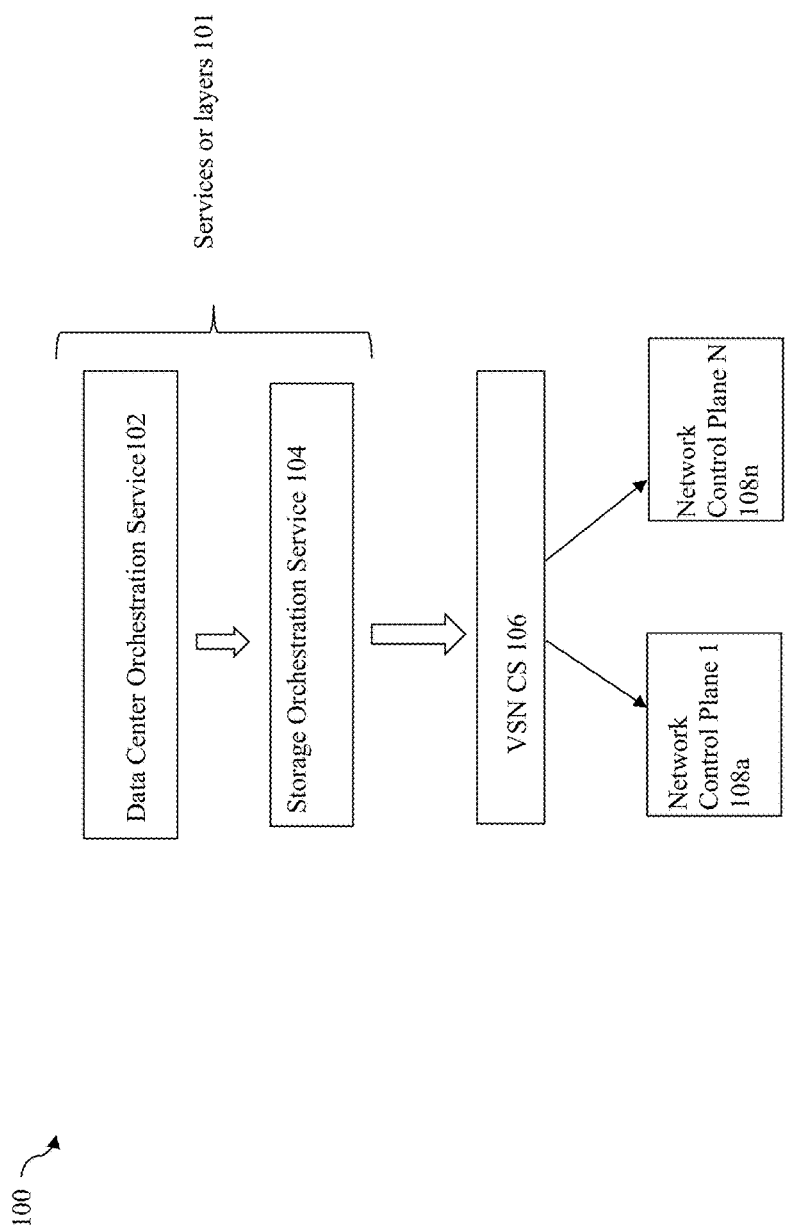
FIG. 3 is an example of services and network control planes that may be used in an embodiment in accordance with techniques herein.

Referring to FIG. 3, shown is an example of different software services or layers that may be used in an embodiment in accordance with techniques herein. The example 100 includes a data center (DC) orchestration service 102, a storage orchestration service 104, the VSN CS 106, and N network control planes 108a-n. The example 100 illustrates services or software layers that may be included in a runtime stack in an embodiment in accordance with techniques herein to use the VSN CS 106. Elements 102 and 104 are examples of services or one or more software layers that may be above the VSN CS 106 in the runtime stack. Service 104 may be generally characterized as an example of a consumer or client of the VSN CS 106 that may make network connectivity requests to the VSN CS 106. As described herein, the VSN CS 106 may communicate, at runtime with any one or more network control planes 108a-n depending on the particular software used to provision and manage a VN, such as a VSN.

Generally, a Data Center (DC) may be defined as a physical complex housing physical servers, network switches and routers, network service appliances, and networked storage. The purpose of DC is to provide, for example, application, compute, and/or storage services.

In the example 100, the DC orchestration service 102 may control and coordinate different data center operations and requests. The storage orchestration service 104 may be a service invoked by the service 102. In this example, the service 104 may issue requests to the VSN CS 106 such as, for example, to create a new VN, add ports, endpoints or other connectivity points to a VN, and the like. Further examples are described elsewhere herein.

Figure 4:
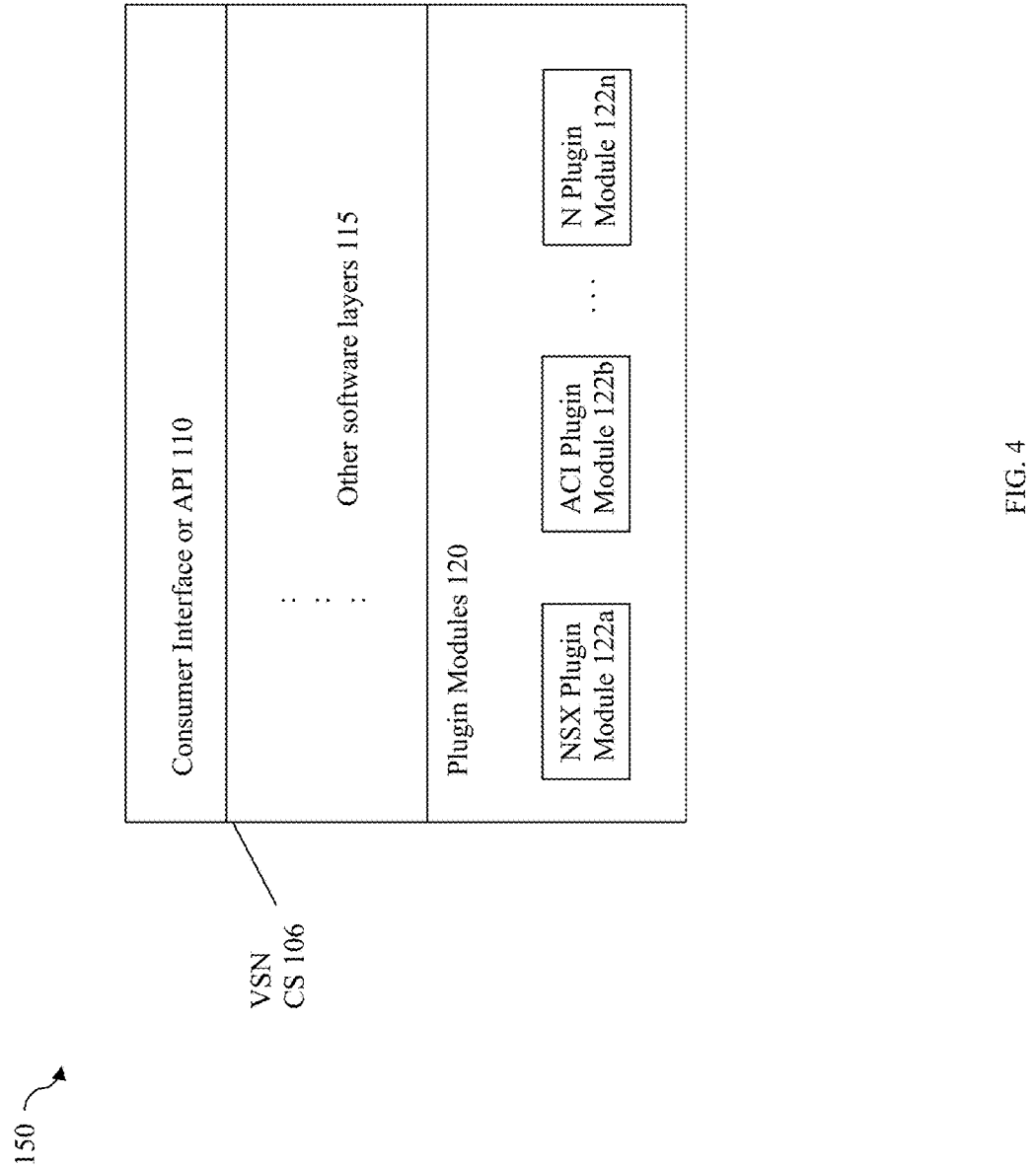
FIGS. 4 and 7 are more detailed examples of software layers and modules that may be included in an embodiment of a virtual storage network connectivity service (VSN CS) in accordance with techniques herein.

Referring to FIG. 4, shown is an example 150 providing more detail regarding various software layers, modules, and the like, that may comprise the VSN CS 106 in an embodiment in accordance with techniques herein. The VSN CS 106 may include a consumer interface or API 110, plugin modules 120 and one or more other software layers 115. Generally, an embodiment may partition the processing to perform supported operations in an embodiment in accordance with techniques herein in any suitable manner whereby such processing may be performed by partitioned among modules comprising 110, 115 and 120. Additional detail regarding layers or modules that may comprise 150 in one embodiment in accordance with techniques herein are described elsewhere in more detail.

The consumer interface or API 110 may correspond to the northbound or first API described above provided for consumers and clients of the VSN CS 106. As noted above, the interface of API 110 may be characterized as network-agnostic and storage-friendly. In at least one embodiment, the consumer interface of API 110 may be a vendor-neutral and platform-neutral API (e.g. neutral or independent with respect to the different supported platforms and associated network control planes). As such, the API 110 may be based on common concepts and entities using terminology that are vendor neutral or independent of the particular VN platform or controller implementation. The API may include, for example, a CLI (command line interface) and API both using vendor neutral or vendor independent command terminology. Additionally, such an API 110 may use terminology that is storage friendly whereby the interface is based on concepts and terminology that does not require an in depth understanding of network connectivity. The consumer interface may be characterized as storage-friendly in that the consumer interface is usable by any supported storage service or storage component to establish connectivity to any other potentially connectable supported storage service or storage component. The consumer interface may be characterized as storage-friendly in that a consumer or client using the interface may have minimal knowledge of network concepts, terminology, control planes, processing performed to implement a network connectivity request, and the like. For example, the consumer or client using the consumer interface does not need to know the detailed processing steps performed to service a network provisioning request. The consumer merely uses the consumer interface to make a network connectivity request and the VSN CS performs the processing necessary to implement or service the request. A consumer or client using the interface is provided with an abstraction of the network control planes and the network control-plane specific interfaces associated with the network control planes. Thus, a consumer of the consumer interface is insulated from changes to the plurality of network control planes, the associated interfaces, the particular network control-plane specific concepts and terminology, and the like. In other words, the consumer interface provides a layer of abstraction from the network control planes and associated interfaces used in communicating with the control planes.

As also noted above, the VSN CS 106 receive connectivity requests made using the consumer API 110 and translate them into operations performed using a southbound or second API used by the various plugin modules 120. The plugin modules 120 make outbound calls or requests to any of the different platform-specific APIs used by the supported network controllers. The plugin modules 120 includes multiple plugin modules 122a-n denoting the N supported controllers and different software-based VN platforms in this examples. Each of the different plugin modules 122a-n denotes a different set of outgoing API calls in accordance with particular exposed API of one of the network control planes of one of the supported platforms for software-based VNs. For example, plugin module 122a may be used to interface with one of the two different NSX controllers (as mentioned elsewhere herein) to provision network resources and control and manage a VN of the particular VMware® NSX platform. Plugin module 122b may be used to interface with the ACI controller and control plane to provision network resources and control and manage a VN of the ACI framework and architecture by CISCO®. In a similar manner, each of the different plugin modules 122a-n may be generally utilized to facilitate communications with a different supported controller and different supported network control plane. Each of 122a-n may be customized for the particular controller-specific exposed API of one of the network control planes and thereby makes outgoing calls in accordance with the particular controller-specific API. Each of 122a-n localizes changes to network control planes thereby isolating each control plane's evolution from the VSN CS's upper layers 115 and 110.

It should be noted that the example 150 generally illustrates layers that may be included in an embodiment of the VSN CS as may be used in connection with a VN for storage or I/O traffic, or more generally, a VN for any suitable purpose.

Figure 5:
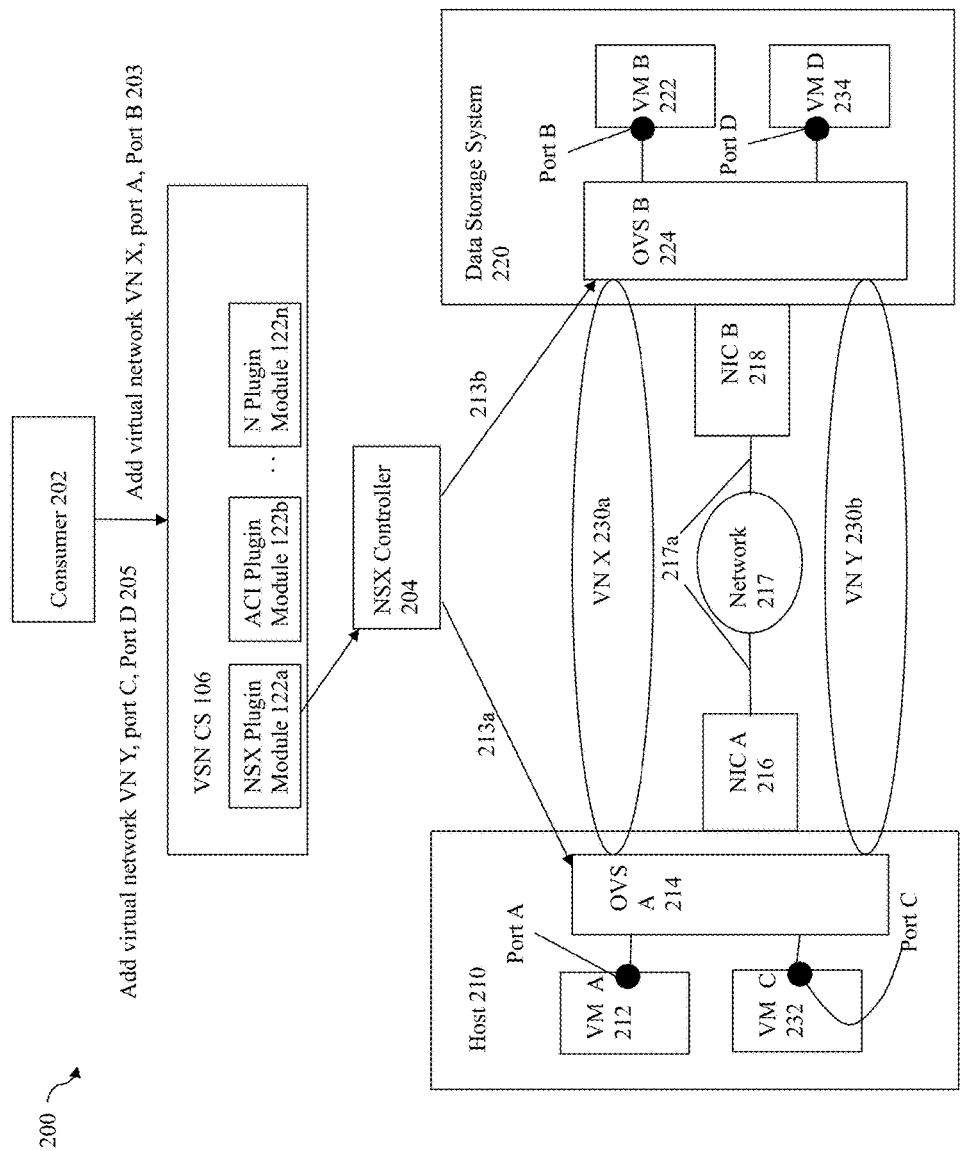
FIGS. 5, 5B, 6A, 6B and 6C are examples illustrating use of the VSN CS in an embodiment in accordance with techniques herein.

Referring to FIG. 5, shown is an example illustrating use of the VSN CS 106 in connection with creating multiple VNs in an embodiment in accordance with techniques herein. The example 200 includes a consumer 202 of the VSN CS 106 which issues a request 203, such as to add a new VN. The request 203 may be issued, for example, by a storage administrator, from another service (e.g., such as service 104), and the like. The request 203 is communicated to the VSN CS 106 in accordance with the defined consumer API or interface 110 of FIG. 4.

In response, the VSN CS 106 may perform processing to service the request 203 by issuing appropriate outgoing calls to a network controller and control plane using one of the plugin modules suitable for communicating with the network controller. In this example 200, the VN is created using an NSX controller 204 and associated control plane. The VSN CS 106 may perform processing using any suitable technique to determine the particular platform and associated controller and control plane to which it communicates to service the request 203. For example, in one embodiment, the VSN CS 106 may read information from a configuration file which identifies the particular controller and VN platform.

In this example 200, the VSN CS 106 determines that it has to communicate with the NSX controller 204 in accordance with the NSX-specific network control plane/controller API. As a result, the VSN CS 106 uses the NSX plugin module 122*a* to communicate with the NSX controller 204 to service the request 203 and add the VN. In this example, the request 203 may be to add a first VN, VN X 230*a*, for a first data storage system tenant or customer. Adding the VN X 230*a* may include a first step to define or name the VN X 230*a* instance and then a second step to add one or more ports, or more generally, one or more endpoints or interface connections to the VN X 230*a*. The VSN CS 106 communicates with the NSX controller 204 to create the VN X 230*a* and provision network resources for the VN X 230*a*. In one embodiment, the request 203 may include information, for example, identifying the name of the tenant for which the VN instance is being created, providing a name for the VN instance (e.g., such as a string denoting an identifying user label for the VN instance), and one or more ports or endpoints to be added to the VN X 230*a*. In this example, the request 203 may identify the tenant "X", provide a name or identifier of "VN X" for the VN being added, and may identify two ports or interface connections to be added to VN X 230*a*. The two ports or interface connections to be added to VN X 230*a* may be port A and port B. Port A may be virtual port or interface connection to VM A 212 and port B may be a virtual port or interface connection with VM B 222.

In the example 200, VN X 230*a* includes port A on host 210 and port B on data storage system 220. More generally in a VSN as described elsewhere herein, such ports, endpoints or interface connections may be between two hosts, two data storage systems or appliances, a data storage system or appliance and a host, and the like. The host 210 has VM A 212 and VM C 232 executing thereon. As described elsewhere herein, one or more applications may be executing in the context of each of the VMS 212, 232. The data storage system 220 may include physical storage devices, expose LUNs to which applications of VM A 212 issue I/Os and the like, as described elsewhere herein. Such details have been omitted from element 220 for simplicity of illustration. The data storage system 220 includes VM B 222 and VM D 234 executing thereon. In one embodiment, each of the VMs 222 and 234 may be a virtualized instance of code of a particular data storage system, such as executing code for a virtualized VMAX® data storage system.

It should be noted that the VMs of both the host 210 and data storage system 220 may run under management of a hypervisor not illustrated also for purposes of simplicity.

The host 210 also includes a first Open Vswitch (OVS), OVS A 214, and the data storage system 220 includes a second OVS, OVS B 224. OVS or Open vSwitch is a production quality, multilayer virtual switch licensed under the open source Apache 2.0 license. OVS can operate both as a software-based switch running within the VM hypervisors, and as the control stack for dedicated switching hardware. As a result, OVS has been ported and used in multiple virtualization platforms. In this example, OVS is used in connection with the NSX controller and control plane. Traffic to and from an OVS may flow through a port of the NIC. On the client/hypervisor, the OVS then directs incoming traffic to the appropriate VM. With reference to FIG. 5, traffic to and from the OVS A 214 may flow through a port of the NIC A 216, and traffic to and from the OVS B 224 may flow through a port of the NIC B 218.

In this example, the OVSs 214 and 224 may be characterized as virtual network entities or software defined entities created and used with the particular NSX controller 204 and control plane. The NSX controller 204 communicates with the OVSs 214 and 224 whereby the OVSs 214 and 224 receive configuration and flow information from the NSX controller 204. It should be noted that OVS is a software defined entity used in connection with this particular NSX control plane. Similarly, the NSX network control plane refers to its VN using a software defined entity called a logical switch. Other network controllers and network control planes may use different software defined entities in connection with their associated VNs.

To add VN X 230*a* with the two specified ports, port A and B, the NSX controller 204 communicates 213*a* with OVS A and communicates 213*b* with OVS B. In one embodiment, each of the Ports A and B may have an associated MAC address specified in the request. As known in the art, a MAC (media access control) address may be characterized as a unique identifier assigned to network interfaces for communications.

At a second point in time, a second request 205 may be received by VSN CS 106 from the consumer 202 to create a second VN, VN Y. The request 205 may be to add a VN Y 230*b* for a second data storage system tenant or customer. Adding VN Y 230*b* may include a first step to define or name the VN Y 230*b* instance and then a second step to add one or more ports, or more generally, one or more endpoints or interface connections to the VN Y 230*b* similar to as described for VN X 230*a*. The VSN CS 106 communicates with the NSX controller 204 to create the VN Y 230*b* and provision network resources for the VN Y 230*b*. In one embodiment, the request 205 may include information, for example, identifying the name of the tenant for which the VN instance is being created, providing a name for the VN instance (e.g., such as a string denoting an identifying user label for the VN instance), and one or more ports or endpoints to be added to the VN Y 230*b*. In this example, the request 205 may identify the tenant "Y", provide a name or identifier of "VN Y" for the VN being added, and may identify two ports or virtual interface connections to be added to VN Y 230*b*. The two ports or interface connections to be added to VN Y 230*b* may be port C and port D. Port C may be virtual port or interface connection to VM C 232 and port D may be a virtual port or interface connection with VM D 234. To add VN Y 230*b* with the two specified ports, port C and D, the NSX controller 204 communicates 213*a* with OVS A and communicates 213*b* with OVS B. In one embodiment, each of the Ports C and D may have an associated MAC address specified in the request.

The network underlay or physical network infrastructure may include NIC A 261, NIC B 218 and network 217 as well as the physical wires, cables or connection 217*a* therebetween. The network overlay in this example includes VN X 230*a* and VN Y 230*b* which both share the network underlay. VNX 230*a* may be defined to include port A and port B as endpoints whereby VN X 230*a* is from port A, through OVS A 214, NIC A 216, network 217, NIC B 218, OVS B 224 and to port B. VN Y 230*b* may be defined to include port C and port D as endpoints whereby VN Y 230*b* is from port C, through OVS A 214, NIC A 216, network 217, NIC B 218, OVS B 224 and to port D.

Thus, use of the VSN CS 106 abstracts out or insulates the consumer 202 from the particulars of the control plane and controller utilized in a particular instance. The VSN CS 106 also facilitates communication with multiple different network control planes and associated controllers through the plugin API architecture of the VSN CS 106 (e.g., as provided by plugin modules 122*a-n* of plugin module layer 120 in FIGS. 4 and 5). For example, FIG. 5 illustrates runtime execution flow through the NSX plugin 122*a* without using any of the other plugin modules 122*b-n* due to the particular NSX controller and control plane illustrated. However, if the control plane used was, for example, the ACI control plane, the module 122*b* would be invoked at runtime as part of the execution flow rather than module 122*a* specifically used for the NSX control plane.

Figure 5B:
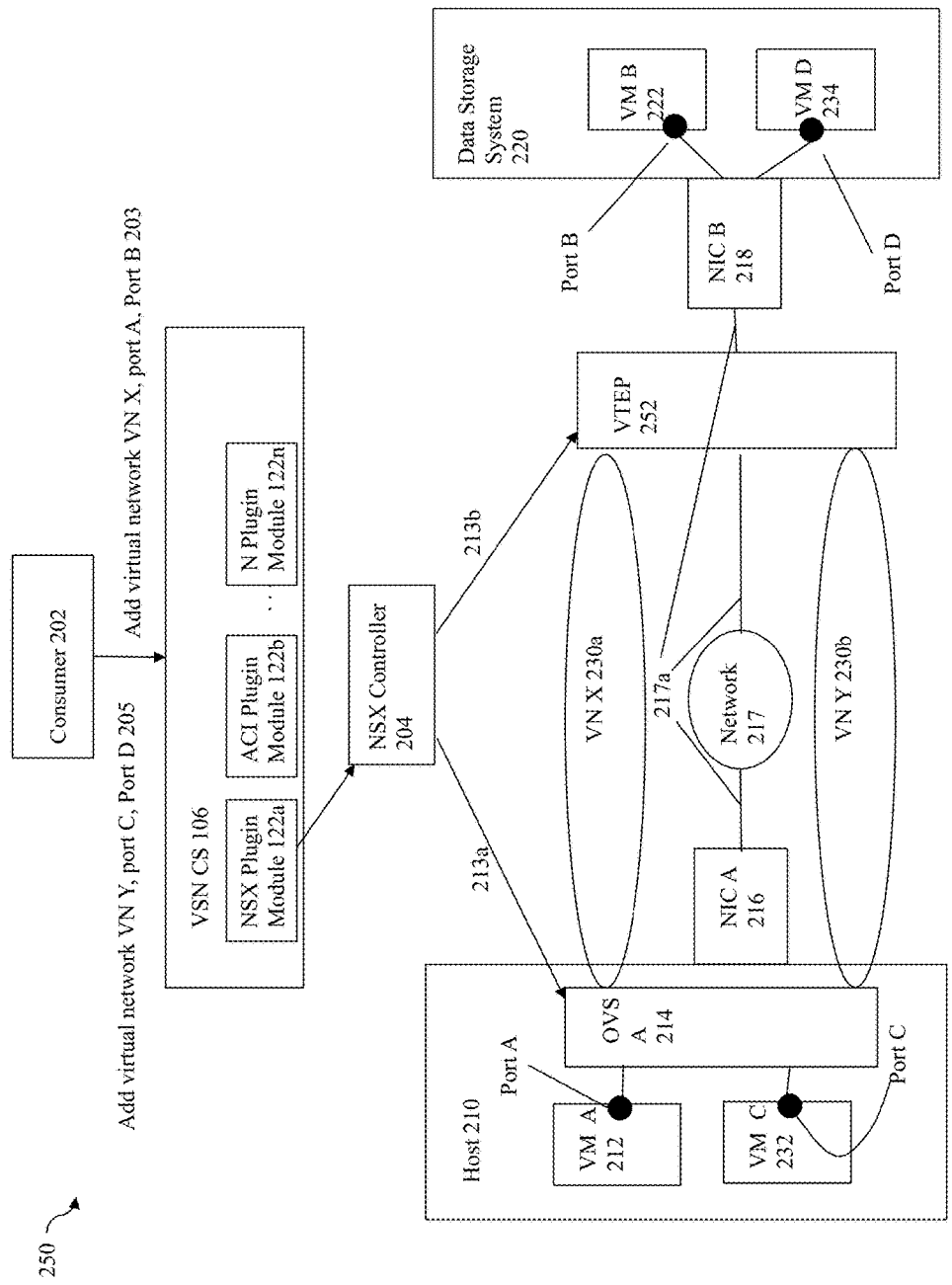

Referring to FIG. 5B, shown is another example illustrating use of the VSN CS 106 in connection with creating multiple VNs in an embodiment in accordance with techniques herein. The example 250 of FIG. 5B includes similarly numbered components having functionality and representing processing as described in connection with FIG. 5. A difference between FIGS. 5 and 5B is that FIG. 5B includes VTEP (Virtual Tunnel Endpoint) 252 rather than OVS B 224. VTEP is another virtual network entity or software defined entity created and used with the particular NSX controller 204 and control plane. The NSX controller 204 communicates with the OVS 214 and VTEP 252 whereby the OVS 214 and VTEP 252 receive configuration and flow information from the NSX controller 204. It should be noted that VTEP is a software defined entity used in connection with this particular NSX control plane. A VTEP has two logical interfaces: an uplink and a downlink. The uplink is responsible for receiving frames and acts as a tunnel endpoint with an IP address used for routing encapsulated frames. These IP addresses are infrastructure addresses and are separate from the tenant IP addressing for the nodes using the VXLAN fabric. VTEP functionality can be implemented in software such as a virtual switch or in the form a physical switch.

Thus, techniques herein may be used to automate processing of network connectivity requests such as for provisioning network resources, as well as controlling, managing and/or monitoring VNs and facilitate communication with any one of multiple supported network control planes.

Figure 6A:
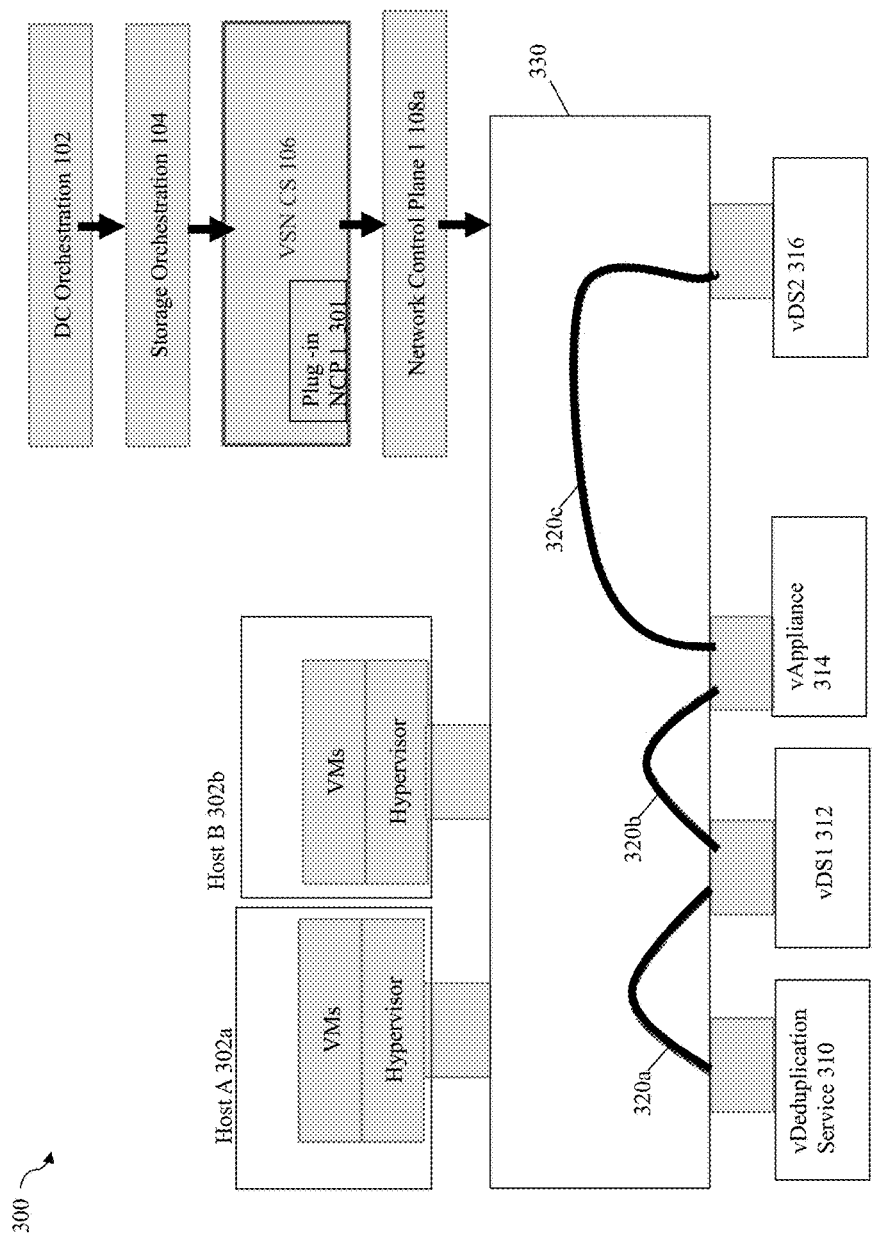
Figure 6B:
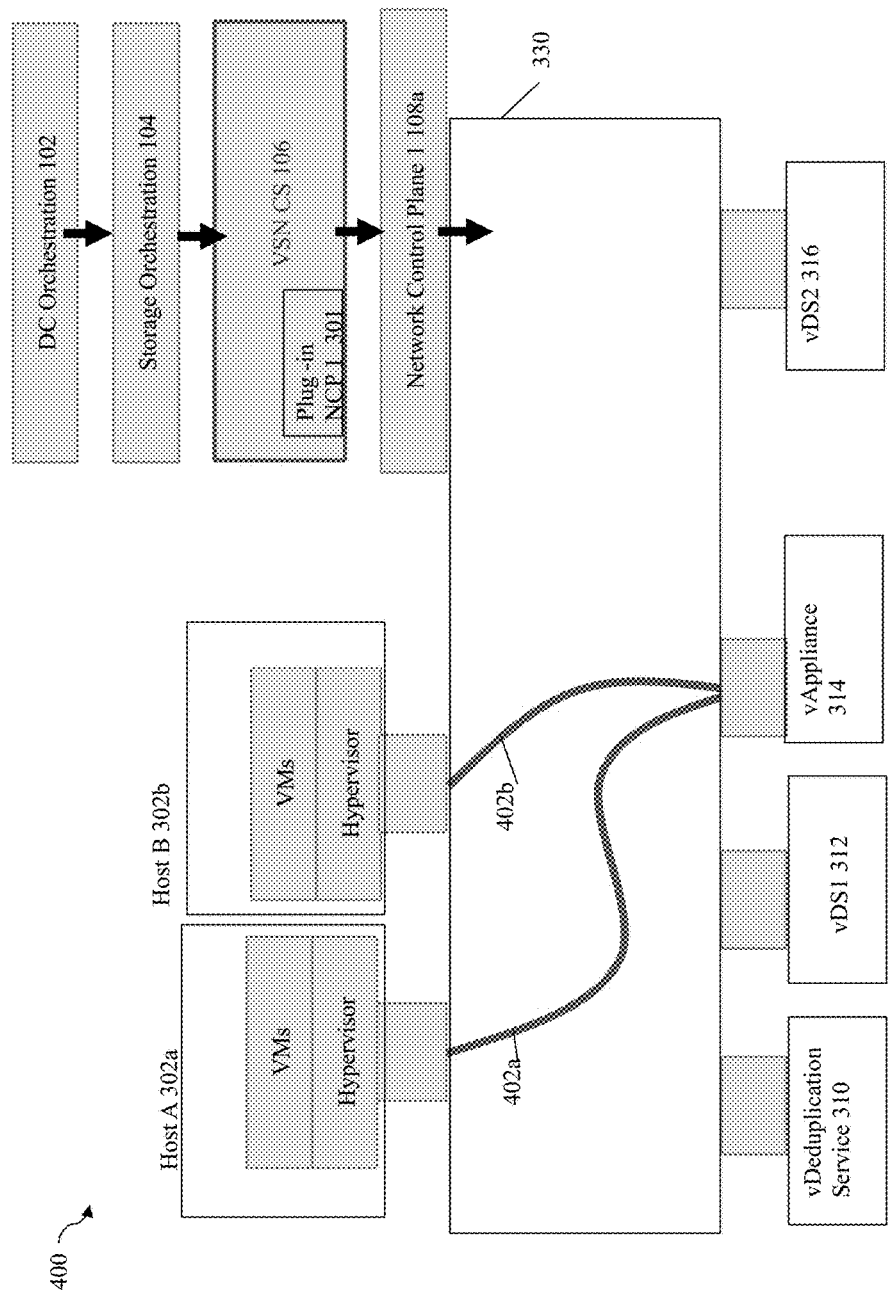
Figure 6C:
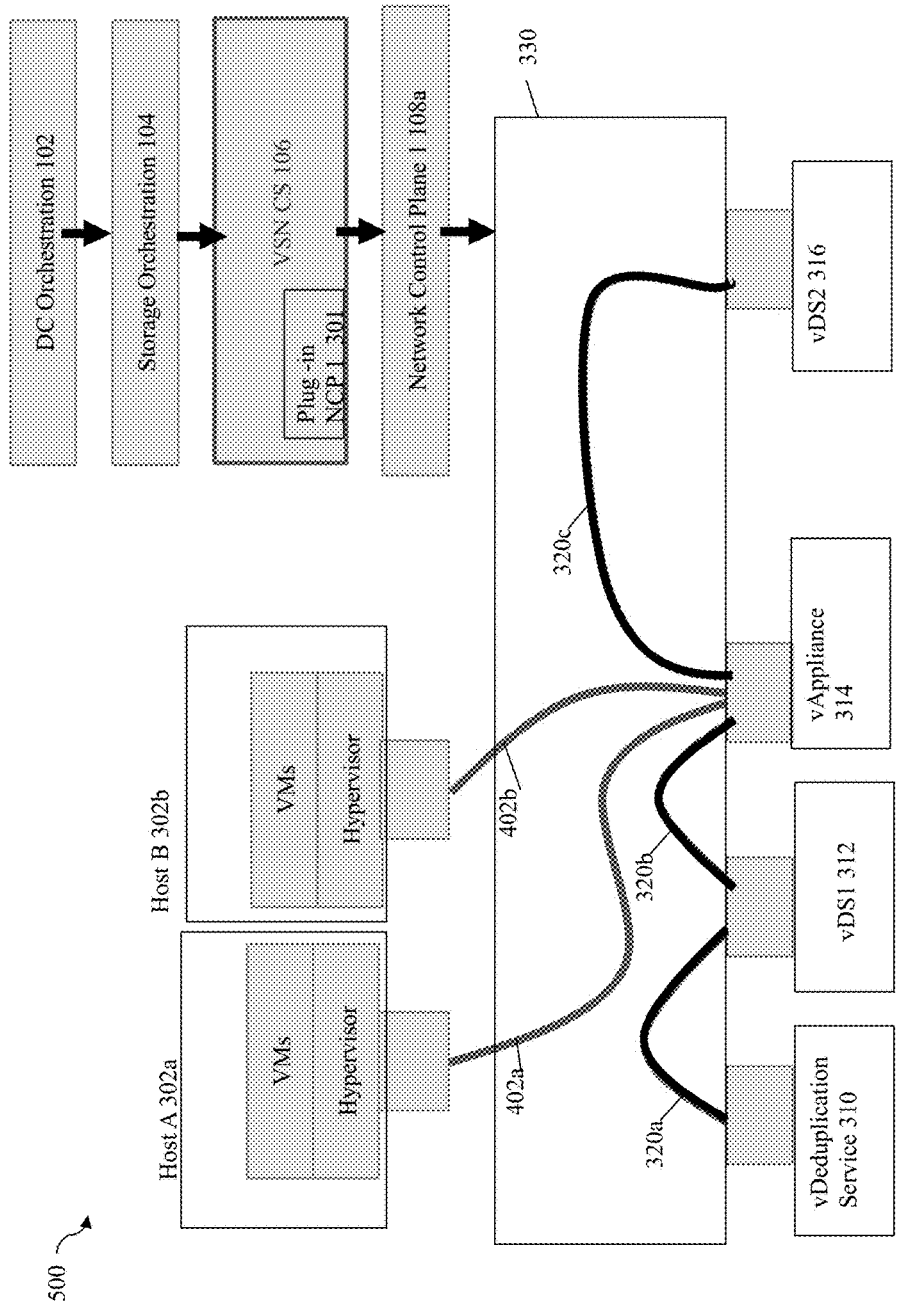

What will now be described in connection with FIGS. 6A-6C is another example illustrating use of an embodiment of the VSN CS 106. In this example, various storage services may be installed and executed, interconnected, moved around the network and/or deinstalled (e.g., torn down) under the control of centralized orchestration, such as by the DC orchestration service 102 and/or storage orchestration service 104. Various data storage services or functionalities that may be performed in an embodiment may be instantiated as virtual storage functions (VSFs) using, for example, a VM, multiple VMs, or as a combination of physical and virtual resources. The VSN CS 106 may be used, for example, to add or remove connectivity between VSFs and the physical storage resources. In following paragraphs and description, it should be noted that VSFs may also synonymously be referred to herein as virtualized versions of services, data storage systems, appliances and other components.

It should be generally noted that although examples herein illustrate VSNs that use "virtualized" storage functions, techniques herein may be applied for using with VSNs that include the actual legacy component in a non-virtualized form. For example, rather than use a virtualized data storage system or virtualized data storage appliance, the actual data storage system or data storage appliance may be used with a VSN. An embodiment may include a VSN with any suitable mixture of VSFs and/or non-virtualized services or components.

An embodiment using the VSN CS 106 in accordance with techniques herein provides for automation of network provisioning tasks needed to connect the VSFs. The connectivity automation provided using the VSN CS 106 may be used, for example, to dynamically establish interconnection of desired VSFs, enable connecting VSFs to physical storage resources, and the like.

With reference to FIG. 6A, the VSFs may be virtualized or executed as VMs connected to physical network underlay 330. The example 300 includes orchestration services 102 and 104 where requests for storage network connectivity originate, are passed to the VSN CS 106 whereby the VSN 106 then interacts to the network control plane 108*a* to create the desired connectivity of the three VSNs 320*a-c*. In the example 300, the plugin module NCP1 301 is used to communicate with the particular network control plane 108*a*.

The example 300 includes a virtualized data deduplication (vDeduplication) service) 310, a first virtualized data storage system (vDS1 312), a virtualized data storage appliance (vAppliance) 314, and a second virtualized data storage system (vDS2) 316. vDS1 312 may be, for example, code of a first data storage system DS1, such as a VMAX® data storage system executed in the context of a VM. Thus, element 312 may denote that code typically executed by DS1 such as, for example, to service I/O requests is executed in the context of a VM (e.g., microcode of front end and back end components such as FAs, DAs, and the like may be executed in a VM). In a similar manner, element 316 may denote that code typically executed by DS2 such as, for example, by a VNX® data storage system to service I/O requests, is executed in the context of a VM (e.g., microcode of front end and back end components of the VNX® data storage system such as FAs, DAs, and the like may be executed in a VM). Element 314 may denote that code typically executed by a data storage appliance, such as a VPLEX® storage appliance, is executed in the context of a VM.

Element 320*a* represents a first VSN created as the result of a first network connectivity request to add data deduplication service 310 to virtual DS1 312. Element 320*b* represents a second VSN created as the result of a second connectivity request to add virtual data storage system capacity of DS1 312 to the virtual data storage appliance 314. Element 320*c* represents a third VSN created as the result of a third connectivity request to add virtual data storage system capacity of DS2 316 to the virtual data storage appliance 314.

Thus, FIG. 6A illustrates use of the VSN CS 106 in connection with servicing network connectivity requests between virtualized data storage system services or VSFs 310, 312, 314 and 316. Each of 310 and 314 may be executed on any suitable one or more physical systems such as, for example, one or more hosts or other computer systems, one or more data storage systems, and the like. Each of 312 and 316 may be executed on any suitable one or more data storage systems including physical storage devices.

In FIGS. 6A, 6B and 6C, it should be noted that details of the underlay network are omitted for the sake of simplicity of illustration. However, in such figures, a suitable physical network infrastructure as well as the various logical software entities used in a particular VSN instantiation for the particular network control plane 108a are assumed to be included in a manner consistent with description elsewhere herein.

Referring to FIG. 6B, shown is an example illustrating use of techniques herein to add additional VSNs 402a-b where requests for connectivity connect data storage system clients to data storage system services or VSFs. The example 400 includes orchestration services 102 and 104 where requests for connectivity originate, are passed to the VSN CS 106 whereby the VSN CS 106 then interacts to the network control plane 108a to create the desired connectivity of the two VSNs 402a-b. In the example 400, the plugin module NCP1 301 is used to communicate with the particular network control plane 108a. The data storage clients are the VMs executing on host A 302a and host B 302b.

Element 402a represents a VSN created as the result of a first network connectivity request to connect host A 302a, or VMs thereof, to the vAppliance 314. Element 402b represents another VSN created as the result of a second network connectivity request to connect host B 302b, or VMs thereof, to the vAppliance 314.

Thus, FIGS. 6A and 6B illustrate how the VSN CS 106 may be used to process different network connectivity requests and establish connectivity of multiple VNs. In one embodiment, the VSNs of FIGS. 6A and 6B may be added using the VSN CS 106 whereby such VSNs may coexist as illustrated in FIG. 6C to provide for dynamic composition of storage services to clients 302a and 302b. As a result of the foregoing as illustrated in FIG. 6C, the hosts 302a, 302b may issue I/O requests to a LUN of the vAppliance 314 where the LUN may store data used by the hosts 302a, 302b. The vAppliance 314 may use physical storage provisioned on any of vDS1 312 and vDS2 316. Additionally, data deduplication services of 310 may be applied to data stored on vDS1 312.

Figure 7:
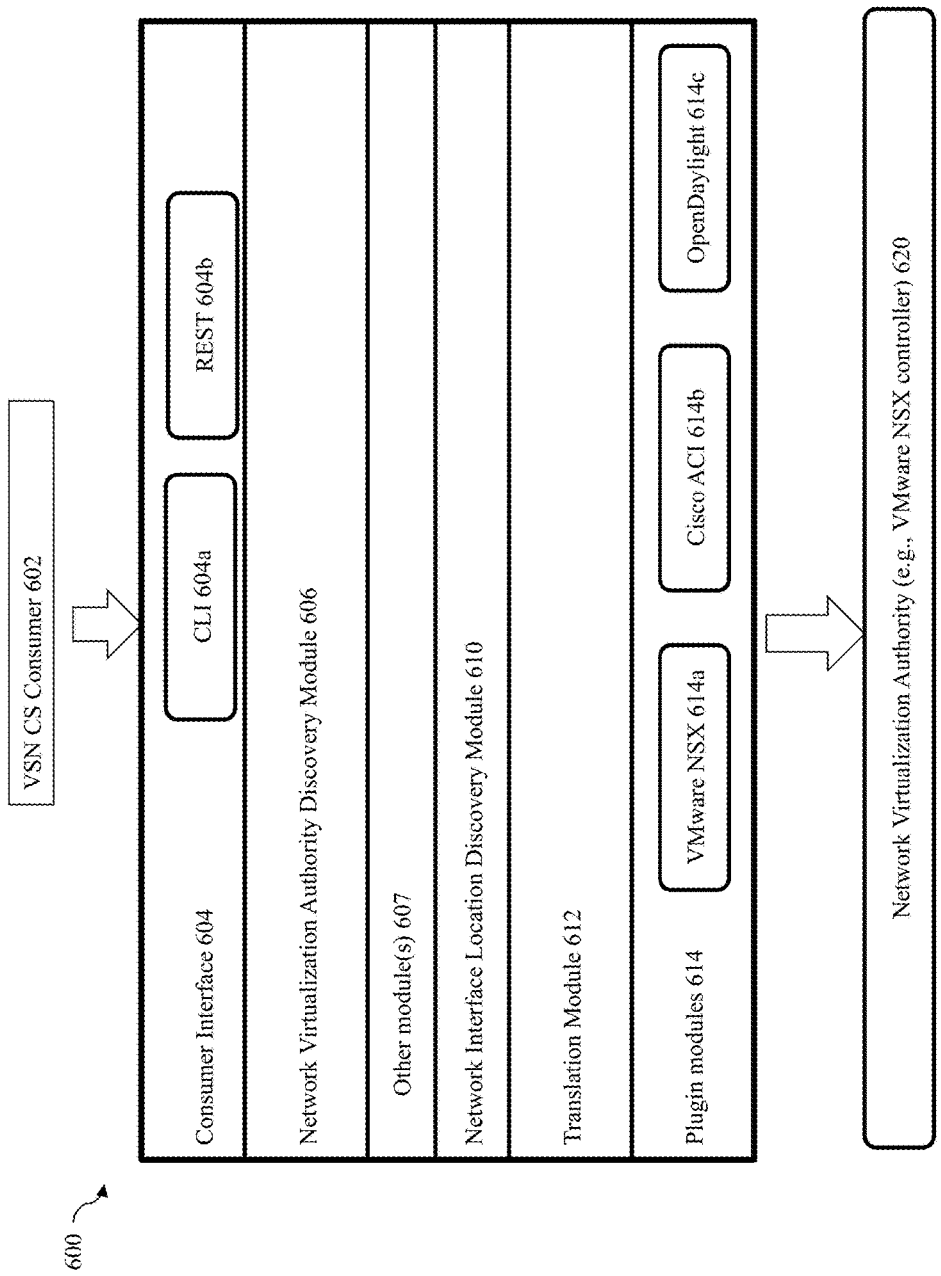

Referring to FIG. 7, shown is an example providing additional detail regarding modules that may be included in an embodiment of the VSN CS in accordance with techniques herein. The example 600 includes consumer interface 604 and plugin modules 614 which are respectively similar to elements 110 and 120 as described elsewhere herein in connection with FIG. 4. Additionally, consumer interface 604 is illustrated as including multiple types of defined interfaces. For example, consumer interface 604 may include a command line interface (CLI) 604a, a REST (Representational State Transfer) API 604b, and possibly other different types of defined consumer interfaces. The REST API 604b may define a set of functions whereby requests, such as network connectivity requests, are sent to, and responses are received from, an associated API service through HTTP (Hyper Text Transfer Protocol).

A VSN CS Consumer 602 may be, for example, an administrator or a storage service (e.g., such as storage orchestration service 104 of FIG. 3) that makes a request to the VSN CS Consumer Interface 604.

Before further describing elements of FIG. 7, definitions and explanations of some terms are first set forth in following paragraphs. The following further definitions and explanation may further supplement other description herein. It should be noted that such terms are defined in the Internet Engineering Task Force, Request for Comments 7365, Framework for Data Center (DC) Network Virtualization, Lasserre, et al., October 2014, ("RFC 7365") which is incorporated by reference herein. RFC 7365 generally provides a framework for DC network virtualization.

A Network Virtualization Edge (NVE) is the network entity that sits at the edge of an underlay network and implements network virtualization functions. The network-facing side of the NVE uses the underlying network to tunnel tenant frames to and from other NVEs. The tenant-facing side of the NVE sends and receives, for example, Ethernet frames to and from individual tenant systems. An NVE may be implemented, for example, as part of a virtual switch within a hypervisor, a physical switch or router, or a network service appliance, or it may be split across multiple devices. For example, an NVE may be an OVS, such as OVS 214 and 224 of FIG. 5.

Consistent with description elsewhere herein, a VN may be characterized as a logical abstraction of a physical network providing network services to a set of tenant systems. A Virtual Network Instance (VNI) refers to a specific instance of a VN from the perspective of an NVE. The underlay or underlying physical network provides the connectivity among NVEs. As mentioned above, a tenant may be a customer using a VN and any associated resources (e.g., compute, storage, and network). A tenant system may be characterized as a physical or virtual system that can play the role of a host or a forwarding element such as a router, switch, firewall, etc. whereby the tenant system belongs to a single tenant and connects to one or more VNs of that tenant.

A virtual access point (VAP) is a logical connection point on the NVE for connecting a tenant system to a VN. Tenant systems connect to VNIs at an NVE through VAPs. VAPs may be, for example, physical ports or virtual ports identified through logical interface identifiers (e.g., VLAN ID or internal vSwitch (Virtual Switch) Interface ID connected to a VM). A vSwitch is function within a hypervisor (typically implemented in software) that provides similar forwarding services to a physical Ethernet switch. A vSwitch forwards frames between VMs running on the same server or between a VM and a physical NIC connecting a server to a physical switch or router. A vSwitch also enforces network isolation between VMs.

A network virtualization authority (NVA) is an entity that provides reachability and forwarding information to NVEs. As an example, each of the different network controllers and/or network control planes such as VMware's NSX, CISCO's ACI, and the like, is an exemplary instantiation of an NVE.

In one embodiment, the consumer interface 604 may provide common (e.g., NVA-independent) methods to perform network connectivity requests and may include one or more methods to perform any of the following network connectivity requests:

1. ADD, REMOVE or SHOW a VNI (e.g., ADD VNI is generally described in connection with FIG. 5);

2. ADD or REMOVE a "Tenant System" to or from a VNI on a particular NVE in a particular DC by connecting the "Tenant System" to a particular VAP;

3. SHOW the "Tenant Systems" that are attached to a VNI on a particular VAP;

4. SHOW a particular VNI (e.g., show information about a particular VNI); and

5. SHOW the "Tenant System", NVE, DC, VAP and NVA instances (e.g., identify those instances currently defined or in existence).

Adding a VNI may include defining the VNI and adding one more VAPs specified in the request. A request to REMOVE any specified entity, such as a VNI, may delete that particular entity. A request to SHOW any specified entity may include listing information about the specified entity/entities. The foregoing are examples of some types of requests and associated methods that may be included in an embodiment. Generally, an embodiment may include any suitable method for servicing any suitable request to perform an operation not limited to those described herein. For example, an embodiment may also include a method to add a port or other interface to a VN.

The Network Virtualization Authority Discovery Module (NVADM) 606 may perform processing that discovers the type of NVA being used to control the connection of a particular "Tenant System" to a particular VNI on a particular NVE on a particular VAP. For example, the NVADM 606 may perform processing to determine the particular network controller and network control plane used for a particular tenant VNI. Thus, the NVADM 606 performs processing which may be used (e.g., such as by the module 612 described below) to further identify the particular one of the plugin modules 614a-c of plugin module layer 614 used in servicing the network connectivity requests for a particular VNI. For example, in one embodiment as described elsewhere herein, the particular NVA, or more specifically, network controller and control plane, used for a particular VNI may be identified in information stored in a configuration file read by NVADM 606.

The Network Interface Location Discovery Module (NILDM) 610 discovers the identity of the NVE that a particular tenant system is physically connected to. Additionally, the discovered NVA (as determined by the NVADM 606) may be used by the NILDM 610 to determine the particular processing steps performed (e.g., how) to discover the identity of the NVE that a particular tenant system is physically connected to. Such processing steps performed to determine the identity of the NVE that a particular tenant system is connected to may vary with the particular NVE (e.g., network controller and network control plane). For example, when adding a VNI for a particular tenant (e.g., such as with an ADD VN X request as described in connection with FIG. 5 elsewhere herein), the module 610 may be invoked in the runtime execution stack to determine the NVE. In connection with the example of FIG. 5 for the request 203 to add VN X, module 610 may determine that the NVEs are OVSs 214 and 224.

The translation module 612 may use the information discovered by the NVADM 606 and/or NILDM 610 (and possibly other information from one or more other modules of 607) to determine how to perform the action being requested by the VSN CS consumer 602. For example, translation module 612 may use the foregoing information to determine which of the plugin modules 614a-c to use in processing a received request and then accordingly invoke the selected one of the plugin modules 614a-c. As mentioned elsewhere herein each of the plugin modules 614a-c is written to interface with the unique API provided by a particular one of the VNAs 620 wherein module 612 may select the particular one of the modules 614a-c in accordance with the particular VNA (e.g., if VNA or controller/control plane is VMware NSX, use module 614a, if VNA or controller/control plane is Cisco ACI, use module 614b, and if VNA or controller/control plane is OpenDaylight, use module 614c).

As described herein, NVADM 606 discovers the NVA used to control each of the NVEs. The NILDM (610) discovers which NVE (e.g., which OVS) each "Tenant System" is connected to (e.g., by using the MAC Address as a KEY). The translation module 612 can then determine which NVA to use to configure the NVE where the tenant system is located and depending upon the NVA type, the steps to actually connect the tenant system to a particular VNI can be different. With this in mind, the role of the translation module is to take the users request, figure out what "language" to use (includes phrasing and grouping) and then pushes the appropriate commands in the appropriate order using the appropriate language and access method to the NVA to create the VN or attach a port to a particular VN (VNI).

In connection with processing a request to ADD a VNI, such as generally illustrated in FIG. 5, the request may be received by consumer interface 604. The module 606 may perform processing to determine that the particular NVE (e.g., controller and control plane) is VMware's NSX. Processing may be performed by modules 610, 612, 614a and/or one or more other modules 607 to initially define the VNI using the appropriate software-defined logical instance(s) (e.g., OVS) of the NSX controller and control plane. Subsequently, processing may be performed to add the one or more ports, or more generally, VAPs, to the newly defined VNI. In connection with adding each of the ports, such processing may include invoking the modules 610, 612 and 614a. In each instance in which module 614a is invoked, module 614a may, in response, interface with the particular NVA instance such as an NSX controller.

It should be noted that element 607 generally represents the one or more additional modules that may be included in an embodiment to perform processing for supported methods or operations. For example, processing to remove a VNI may include invoking modules 606, 612 and 614a as described above. Additionally, one or more additional modules of 607 may be invoked to delete the VNI definition and any associated ports (e.g., VAPs) included in the VNI being removed. The particular processing performed may vary with embodiment and network control plane. In one aspect, functionality of modules 606, 610, 612 and 614 as described herein may be characterized as general functionality commonly performed in connection with many different requested operations. As such, the particular steps performed to service each request may include invoking modules 606, 610, 612 and 614 along with one or more additional modules as may be needed to perform additional processing for a particular request. Thus, when performing a sequence of processing steps to service a received network connectivity request, the sequence may include processing performed by modules 606, 610, 612 and 614 along with additional processing performed by one or more other modules of 607.

Figure 8:
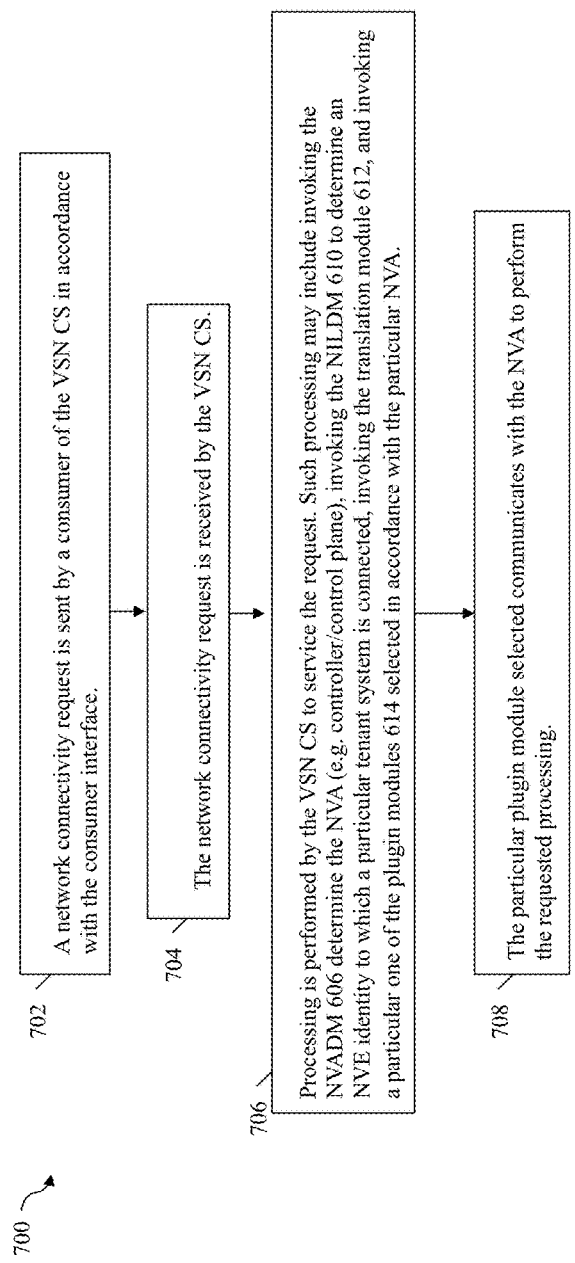
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 700 summarizes processing described above. At step 702, a network connectivity request is sent by a consumer of the VSN CS in accordance with the consumer interface. At step 704, the network connectivity request is received by the VSN CS. At step 706, processing is performed by the VSN CS to service the request. Such processing may include invoking the NVADM 606 determine the NVA (e.g. controller/control plane), invoking the NILDM 610 to determine an NVE identity to which a particular tenant system is connected, invoking the translation module 612, and invoking a particular one of the plugin modules 614 selected in accordance with the particular NVA. At step 708, the particular plugin module selected communicates with the NVA to perform the requested processing for servicing the network connectivity request.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing a first network connectivity request comprising:
   receiving, by a virtual network connectivity service, the first network connectivity request;
   performing first processing by the virtual network connectivity service to service the first network connectivity request, said first processing including:
      determining a first of a plurality of network control planes to which the first network connectivity request is directed;
      selecting, in accordance with the first network control plane, one of a plurality of modules;
      invoking the one module in connection with performing processing by the first network control plane to service the first network connectivity request, wherein the one module facilitates communication with a first network controller of the first network control plane; and
      servicing, by the first network controller, the first network connectivity request, wherein the virtual network connectivity service is a virtual storage network connectivity service, the first network connectivity request is a request in connection with network connectivity over a first virtual network for a first tenant, and the first virtual network is a virtual storage network that carries first I/O traffic of a first data path for the first tenant, the first I/O traffic including read and write operations issued by an application of the first tenant over the first data path; and
   receiving, by the virtual network connectivity service, a second connectivity request in connection with network connectivity over a second virtual network for a second tenant, wherein the second virtual network is a virtual storage network that carries second I/O traffic of a second data path for the second tenant, the second I/O traffic including read and write operations issued by an application of the second tenant over the second data path, wherein the first virtual network and the second virtual network share provisioned resources of a same physical network, wherein the first network connectivity request requests that the first network controller of the first network control plane provision resources including adding one or more ports of a data storage system to the first virtual network for the first tenant, and wherein the second connectivity request requests provisioning resources including adding the one or more ports of the data storage system to the second virtual network for the second tenant.

2. The method of claim 1, wherein the virtual network connectivity service services network connectivity requests for the plurality of network control planes and wherein each of the plurality of modules is customized to interface to a different one of the plurality of network control planes.

3. The method of claim 1, wherein the virtual network connectivity service includes a consumer interface that receives the first network connectivity request.

4. The method of claim 3, wherein the consumer interface includes any of a command line interface and an application programming interface.

5. The method of claim 4, wherein the first network connectivity request is made using any of the command line interface and the application programming interface included in the consumer interface.

6. The method of claim 2, wherein each of the plurality of network control planes includes a network controller for said each network control plane, and wherein a network control-specific application programming interface is specified for communicating with the network controller.

7. The method of claim 6, wherein a first network-control specific application programming interface is specified for communicating with the first network controller of the first network control plane and the one module is customized to communicate with the first network controller using the first network-control specific application programming interface.

8. The method of claim 1, wherein the virtual network connectivity service includes a first discovery module that discovers a type of control plane used in connection with a virtual network for which the first network connectivity request is issued, and wherein said first discovery module is invoked in said determining to determine the first network control plane to which the first network connectivity request is directed.

9. The method of claim 1, wherein the virtual network connectivity service includes a second discovery module that discovers an identity of a network virtualization edge, and wherein the second discovery module is invoked to perform one or more operations of said first processing.

10. The method of claim 1, wherein the method further includes:
    performing second processing by the virtual network connectivity service to service the second network connectivity request, said second processing including:
       determining a second of the plurality of network control planes different from the first network control plane to which the second network connectivity request is directed;
       selecting, in accordance with the second network control plane, a second of the plurality of modules; and
       invoking the second module in connection with performing processing to service the second network connectivity request.

11. The method of claim 10, wherein a second network-control specific application programming interface is specified for communicating with a second network controller of the second network control plane and the second module is customized to communicate with the second network controller using the second network-control specific application programming interface.

12. The method of claim 1, wherein the first virtual network carries I/O traffic of the first data path, said first network connectivity request establishing a connection between two data storage system services.

13. The method of claim 1, wherein the first network connectivity request is a request to perform any of: add the first virtual network, remove the first virtual network, show information about the first virtual network, add a tenant system to the first virtual network on a particular network virtualization edge by connecting the tenant system to a particular virtual access point, remove a first tenant system from the first virtual network on a particular network virtualization edge by connecting the first tenant system to a particular virtual access point, show tenant systems attached to the first virtual network on a particular virtual access point, and show information about any of: one or more virtual networks including the first virtual network, one or more tenant systems, one or more network virtualization edges, one or more virtual access points, one or more network virtualization authorities, one or more network control planes, one or more network controllers, and one or more data centers.

14. The method of claim 3, wherein the consumer interface is network agnostic and network control plane neutral having a vocabulary that is independent of any of the plurality of network control planes.

15. The method of claim 14, wherein the consumer interface is storage-friendly in that the consumer interface is usable by any storage service to establish connectivity to any other potentially connectable storage service.

16. The method of claim 15, wherein the consumer interface is storage-friendly in that the consumer interface provides an abstraction to a consumer using the consumer interface regarding the first processing performed to service the first network connectivity request.

17. The method of claim 15, wherein the consumer interface is storage-friendly in that the consumer interface provides an abstraction of the plurality of network control planes and a different one of a plurality of interfaces associated with each of the plurality of network control planes and insulates a consumer of the consumer interface from changes to said plurality of network control planes and the plurality of interfaces.

18. A system comprising:
a processor; and
a memory comprising code stored thereon that, when executed performs a method of processing a first network connectivity request including:
    receiving, by a virtual network connectivity service, the first network connectivity request;
    performing first processing by the virtual network connectivity service to service the first network connectivity request, said first processing including:
        determining a first of a plurality of network control planes to which the first network connectivity request is directed;
        selecting, in accordance with the first network control plane, one of a plurality of modules;
        invoking the one module in connection with performing processing by the first network control plane to service the first network connectivity request, wherein the one module facilitates communication with a first network controller of the first network control plane; and
    servicing, by the first network controller, the first network connectivity request, wherein the virtual network connectivity service is a virtual storage network connectivity service, the first network connectivity request is a request in connection with network connectivity over a first virtual network for a first tenant, and the first virtual network is a virtual storage network that carries first I/O traffic of a first data path for the first tenant, the first I/O traffic including read and write operations issued by an application of the first tenant over the first data path; and
    receiving, by the virtual network connectivity service, a second connectivity request in connection with network connectivity over a second virtual network for a second tenant, wherein the second virtual network is a virtual storage network that carries second I/O traffic of a second data path for the second tenant, the second I/O traffic including read and write operations issued by an application of the second tenant over the second data path, wherein the first virtual network and the second virtual network share provisioned resources of a same physical network, wherein the first network connectivity request requests that the first network controller of the first network control plane provision resources including adding one or more ports of a data storage system to the first virtual network for the first tenant, and wherein the second connectivity request requests provisioning resources including adding the one or more ports of the data storage system to the second virtual network for the second tenant.

19. A non-transitory computer readable medium comprising code stored thereon that, when executed, performs a method of processing a first network connectivity request comprising:
receiving, by a virtual network connectivity service, the first network connectivity request;
performing first processing by the virtual network connectivity service to service the first network connectivity request, said first processing including:
    determining a first of a plurality of network control planes to which the network first connectivity request is directed;
    selecting, in accordance with the first network control plane, one of a plurality of modules;
    invoking the one module in connection with performing processing by the first network control plane to service the first network connectivity request, wherein the one module facilitates communication with a first network controller of the first network control plane; and
servicing, by the first network controller, the first network connectivity request, wherein the virtual network connectivity service is a virtual storage network connectivity service, the first network connectivity request is a request in connection with network connectivity over a first virtual network for a first tenant, and the first virtual network is a virtual storage network that carries first I/O traffic of a first data path for the first tenant, the first I/O traffic including read and write operations issued by an application of the first tenant over the first data path; and
receiving, by the virtual network connectivity service, a second connectivity request in connection with network connectivity over a second virtual network for a second tenant, wherein the second virtual network is a virtual storage network that carries second I/O traffic of a second data path for the second tenant, the second I/O traffic including read and write operations issued by an application of the second tenant over the second data path, wherein the first virtual network and the second virtual network share provisioned resources of a same physical network, wherein the first network connectivity request requests that the first network controller of the first network control plane provision resources including adding one or more ports of a data storage system to the first virtual network for the first tenant, and wherein the second connectivity request requests provisioning resources including adding the one or more ports of the data storage system to the second virtual network for the second tenant.

* * * * *